Jan. 18, 1938. H. BECKER 2,105,629
MOVING PICTURE CAMERA CASETTE
Filed Feb. 27, 1936 2 Sheets-Sheet 1
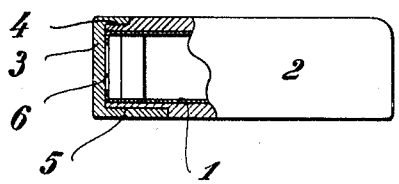
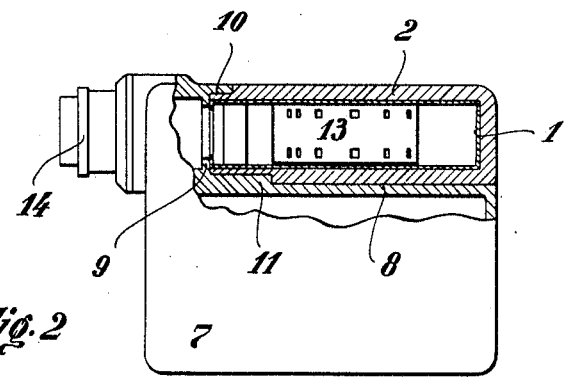
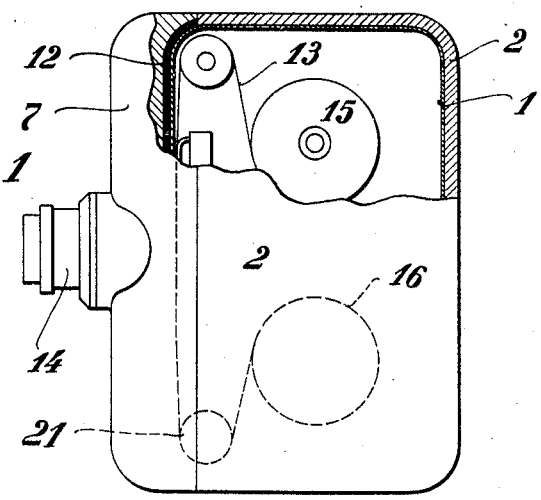
Helmut Becker
INVENTOR
BY Ivan E. A. Konigsberg
ATTORNEY Jan. 18, 1938.   H. BECKER   2,105,629
MOVING PICTURE CAMERA CASETTE
Filed Feb. 27, 1936   2 Sheets-Sheet 2
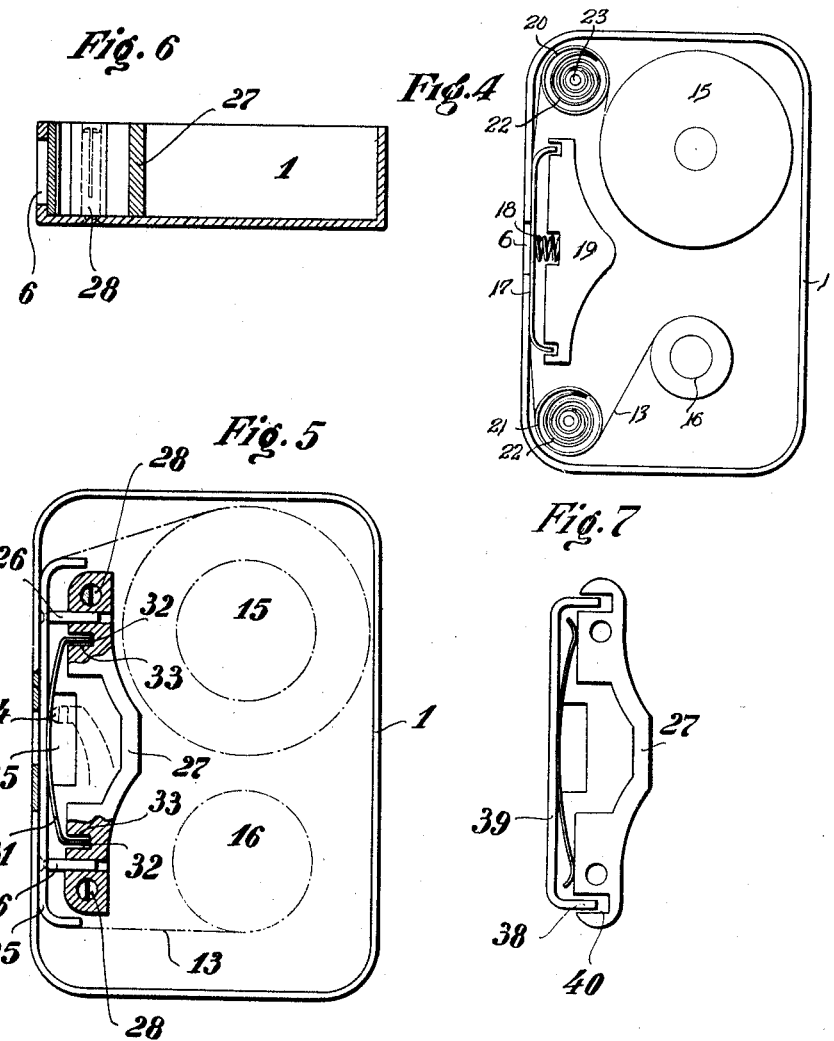
Helmut Becker
INVENTOR
BY Ivan E. A. Konigsberg
ATTORNEY Patented Jan. 18, 1938

2,105,629

UNITED STATES PATENT OFFICE 2,105,629

MOVING PICTURE CAMERA CASETTE

Helmut Becker, Wetzlar, Germany, assignor to Ernst Leitz, G. m. b. H., Wetzlar, Germany Application February 27, 1936, Serial No. 65,947
In Germany March 18, 1935

3 Claims. (Cl. 88—17)

This invention relates to improvements in miniature or amateur moving picture cameras and has particular reference to improvements in the casettes used with such cameras and also to improvements in the film guiding and operating means within the casettes. One object of the invention is to provide a film casette adapted to serve as the cover for the camera whereby to eliminate the necessity for opening and closing the usual camera cover in order to insert or remove the casette and thereby to simplify the handling of the camera. Another object of the invention is to provide certain improvements in the film guiding and operating means within the casette. The film in a moving picture camera runs over guide rollers which usually are supported upon yielding spring pressed arms in order to keep the film taut and steady in operation. It has been found that such spring arm supported rollers act as brakes upon the film and are themselves subject to vibrations which prevent a steady movement of the film instead of assisting in such movement.

It is therefore a further object of this invention to provide film guiding means for tensioning the film in such a manner that a steady even run thereof is obtained. This may be accomplished by mounting the film guiding rollers in yielding laterally movable relation with respect to their supporting shafts. Still another object of the invention is to provide an improved arrangement for guiding the film past the film window behind the camera objective.

With the above and other objects in view this invention is embodied in an improved film casette for moving picture cameras arranged and constructed as hereinafter set forth and as illustrated in the accompany drawings in which—

Fig. 1 is a plan view of a moving picture camera embodying the invention with parts in section and parts broken away.

Fig. 2 is an end view of the camera, partly in section and with parts removed.

Fig. 3 is a detail view of the casette with parts in section.

Fig. 4 is a diagrammatic plan view of the casette showing the improved supports for the film guide rollers.

Fig. 5 is a similar view showing certain improvements relating to the film guiding means between the film rollers.

Fig. 6 is a sectional view of Figure 5.

Fig. 7 is a detail view illustrating a modified construction from that shown in Figure 5.

Referring to the drawings, the film casette 1 is preferably enclosed in a casing 2 provided with a cover 3 which closes the casette lighttight by engagement with recessed portions 4 and 5 of the casing. The casette has a film window 6 and is of course provided with the usual opening, shown at 35 in Fig. 5, for the entrance of the film operating pawl 34 of the camera. The camera 7 is of the type and size usually called miniature cameras or hand cameras, that is a camera which is held by the operator before his eyes while taking the pictures. In this instance the camera is not provided with a removable cover for the insertion of the film casettes but is instead formed with a recessed portion on top of the upper camera wall 8 and behind the upstanding vertical camera wall 9. This recess extends the width of the camera as shown in Figure 1 and is adapted to receive the casette casing 2 which is dimensioned to occupy said recess so that when the casette is attached to the camera in operative position the outlines of the casette coincides with the outlines of the camera, the combined casette and camera forming one boxlike body as shown in Figure 2. In order to attach the casette lighttight to the camera the latter is provided with an overhanging flange 10 and an upstanding step 11 which fit into the recessed portions 4 and 5 of the casette casing as shown in Figure 2. A packing 12 as shown in Figure 1 may be provided to further assist to exclude the light from the joint between the casette and the camera.

It will therefore be clear that it is not necessary to open or close the camera in order to place the film casette with the film 13 in operative position to the camera mechanism and with the film window 6 in operative relation to the objective 14 of the camera. The cover 3 of the casette casing is of course removed before the casette is attached to the camera and again replaced when the film has been used. The cover serves to close the casette lighttight.

The film 13 is as usual wound upon a spool 15 from which it is unwound to pass behind the objective and the film window and is then wound upon a winding-up spool 16. The film is guided behind the film window and maintained in proper operative position by a film guide forming a platen 17 which is yieldingly pressed against the film by suitable means such as a spring 18 seated in a supporting member 19, Figure 4. The arrangement for preventing vibrations or flapping of the film as it is operated and to impart thereto a steady, even movement may be embodied in yieldingly mounted film guide rollers as shown in Figure 4 or by other special means shown in Figures 5 to 7 to be explained hereafter.

In Figure 4 the numerals 20 and 21 designate film guide rollers around which the film is guided as shown. Each guide roller contains a spiral spring 22 the outer end of which engages the inside of the roller while the inner end of the spring surrounds the roller shaft 23. During the operation the film is unwound from the spool 15, run over the guide roller 20 past the film platen 17, over the other guide roller 21 and to the winding-up spool 16. During this movement the spring 23 in the roller 21 urges the latter in the direction of the movement of the film and keeps the film taut and prevents vibrations. When the picture is being taken the film stands still behind the objective but the unwinding spool 15 continues to rotate because of its inertia so that film is unwound from the roll. Such unwinding of the roll would cause the loop around the guide roller 20 to be lengthened and this in turn would impart undesirable vibrations to the film. The spring 18 within the guide roller 20 urges the roller constantly in the direction of movement of the film and therefore takes up and compensates for the additional film which is being unwound from the spool 15 while the picture is being taken. It has been found that by mounting the film guide rollers in yielding laterally movable relation to their axis the film is at all times kept taut and an even movement of the film is obtained. The effect of this construction is different from that heretofore obtained by mounting the guide rollers on swingable spring pressed arms which are subject to vibrations per se which in turn do not assist in imparting an even run to the film but are apt to oppose it and exert a braking effect.

Figures 5, 6 and 7 illustrate a modification which may or may not be used together with the guide rollers as in Figure 4. In this modification the film platen 25 is made extra long and is carried by studs 26 slidably seated in the platen supporting member 27 which in turn is yieldingly mounted upon slotted pins 28. The platen is pressed against the film 13 by a leaf spring 31, the ends 32 of which are seated in recesses 33 in the support 27 and thus serve to exclude the light from the interior of the casette. In Figure 5 the numeral 34 indicates the film operating pawl which extends from the camera and through the casing into the casette through an opening 35 in the latter.

Figure 7 illustrates a modification in which the ends 38 of the film platen 39 extend into recesses 40 in the supporting member 27 to serve as means to exclude light from the interior of the casette.

The invention herein disclosed provides a film casette which contains the film guiding means in compact form and particularly well adapted for use in an arrangement such as shown in which the casette when attached to the camera completes the outlines thereof, which construction possesses a distinct advantage that the camera need not be opened or closed for the purpose of attaching the casette or placing it in operative position to the camera. It will also be observed that the arrangement is such that the combined camera and casette casing forms a convenient boxlike whole such as is familiar to users of the camera. While the invention is disclosed in its preferred form, nevertheless, it will be understood that it is susceptible of changes and modifications and I claim all such changes as come within the principle of the invention and the scope of the appended claims.

I claim:—

1. In combination, a hand camera and a separate film containing casette therefor, said hand camera including a body having a cover and an objective carrying portion arising above the cover along the front edge thereof, means for detachably securing the film casette to the camera for using the film therewith, said means comprising a casing containing the film casette and having an open side for removably placing the casette therein, a film window in the casette facing said open side, cooperating members on the camera and the casing for placing the latter upon the camera with the film window in the casette in operative optical alinement with the camera objective, the top of the camera forming a support for the casing, the sides of the casing and the camera forming a compact boxlike unit adapted to be held by the operator while taking pictures and a cover for closing the open side of the casing when the latter is removed from the camera.

2. In combination, a hand camera and a separate film containing casette therefor, said hand camera including a body having a cover and an objective carrying portion arising above the cover along the front edge thereof, means for detachably securing the film casette to the camera for using the film therewith, said means comprising a casing containing the film casette and having an open side for removably placing the casette therein, flanges surrounding the open side of the casing, other flanges on the camera adapted to be engaged by the aforesaid flanges on the casing for securing the casing on top of the camera cover with the film in the casette in operative relation to the camera mechanism and a cover for closing the open side of the casing when the latter is removed from the camera, said cover having members for engaging the said flanges upon the casing to exclude light from the film within the casette.

3. In combination, a hand camera, including a film conveying pawl, a separate film containing casette therefor having a film window, film operating rollers within the casette for operating the film past the film window including means for yieldingly holding the film in photographing position behind the film window, an opening in the casette through which said film pawl engages the film on the side remote from the said film window, means for detachably placing the casette upon the camera with the film in operative relation to the camera mechanism, said means comprising a casing containing the said film casette, the casing having an open side and the casette film window facing said open side, cooperating flanges upon the camera and the casing for securing the latter to the camera in a position to rest upon the camera, a removable cover for said casing including flanges to engage the said flanges upon the casing for closing the latter lighttight.

HELMUT BECKER.